United States Patent
Murry et al.

(10) Patent No.: US 7,302,804 B2
(45) Date of Patent: Dec. 4, 2007

(54) CABIN AIR COMPRESSOR COOLING SYSTEM

(75) Inventors: Roger P. Murry, San Pedro, CA (US); Chris Speights, Redondo Beach, CA (US)

(73) Assignee: Honeywell International, Inc., Morristown, NJ (US)

( * ) Notice: Subject to any disclaimer, the term of this patent is extended or adjusted under 35 U.S.C. 154(b) by 514 days.

(21) Appl. No.: 10/818,805

(22) Filed: Apr. 5, 2004

(65) Prior Publication Data

US 2004/0261428 A1 Dec. 30, 2004

Related U.S. Application Data

(60) Provisional application No. 60/482,502, filed on Jun. 24, 2003.

(51) Int. Cl.
*F25B 9/00* (2006.01)

(52) U.S. Cl. .................................. 62/86; 62/401

(58) Field of Classification Search .................. 62/86, 62/402, 505, 310, 401; 417/366, 423.8
See application file for complete search history.

(56) References Cited

U.S. PATENT DOCUMENTS

| | | | |
|---|---|---|---|
| 4,487,034 A | 12/1984 | Cronin et al. | |
| 5,844,333 A * | 12/1998 | Sheerin | 310/52 |
| 5,884,498 A | 3/1999 | Kishimoto et al. | |
| 6,499,532 B1 * | 12/2002 | Williams | 165/47 |
| 6,832,644 B2 * | 12/2004 | Stauder et al. | 165/41 |
| 2004/0005228 A1 | 1/2004 | Agriwal et al. | |

* cited by examiner

*Primary Examiner*—Melvin Jones
(74) *Attorney, Agent, or Firm*—Oral Caglar, Esq.

(57) ABSTRACT

A closed loop cooling system and method for an oil-free electric motor of an aircraft cabin air compressor. A closed-loop fan, which may be coupled to a motor rotor opposite a compressor impeller, circulates the required cooling air in a closed loop through a motor stator and bearings, a motor cooler, and a ducting used to complete the flow circuit via a ram air cooled heat exchanger. The cooling air may be pressurized to cabin pressure. The system and method of the present invention eliminates the possibility of contaminating trace amounts of oil in cabin supply air.

33 Claims, 6 Drawing Sheets

CABIN AIR COMPRESSOR COOLING SYSTEM

CROSS-REFERENCE TO RELATED APPLICATIONS

This application claims the benefit of U.S. Provisional Patent Application No. 60/482,502, filed on Jun. 24, 2003.

BACKGROUND OF THE INVENTION

This invention relates generally to a method and apparatus for cooling a motor, and in particular, to a novel closed-loop system for cooling a compressor having air bearings and an air-cooled motor.

Environmental control systems for the more electric aircraft (MEA) use a dedicated compressor to pressurize ambient air for use as fresh air in the cabin. The compressor may be, for example, a single stage centrifugal configuration driven by a variable speed permanent magnet motor. In traditional environmental control systems, the pressurized air for the cabin is bled from the main engine or the auxiliary power unit. The air can sometimes become contaminated with an odor due to the leakage of trace amounts of oil, for example, through shaft seals.

An essential attribute of the MEA environmental control system (ECS) is that the method of compressing ambient air be oil-free. To meet this requirement, the compressor rotating assembly is supported by air bearings and the motor is air-cooled. In order for the air bearings to operate properly, the motor/bearing cavity should be maintained at near cabin pressure. The cooling airflow rate required to maintain satisfactory stator winding temperatures is significant, about 0.3-0.4 lb/min per kW of motor power. At the aircraft maximum cruising altitude, the motor driven compressor can deliver 0.65 lb/min per kW of motor power. Furthermore, the low air density at high altitudes increases the need for large motors with the consequent payload increase. For this reason, the cabin air compressors are by far the largest users of electric power on the more electric aircraft. Given these parameters, it is not feasible to use all fresh air with an open-loop system for motor cooling due to the substantial equipment weight and fuel burn penalties.

An apparatus that attempts to use fresh air within an open-loop system to cool a motor is disclosed in U.S. Patent Application Publication No. 2004/0005228 A1 of Agrawal, et al. The publication describes an oil-free motor-driven compressor/blower for use in fuel cell systems. Fresh, ambient air may be used to cool the motor. The device disclosed in the publication is not suitable for use at high altitudes or aboard flight vehicles, as fresh, ambient air at these conditions is of low density. Using low-density air requires a larger compressor and excess power to achieve the same function as using higher density air for motor cooling. Furthermore, continuous compression of low-density fresh ambient air would be required to use the device of Agrawal et al. The device in the Agrawal publication is not suitable for use aboard an aircraft due to the constraints on equipment size, weight, and power usage of aircraft components.

As can be seen, there is a need for an improved apparatus and method for cooling an electric motor for driving an aircraft cabin air compressor without contaminating the cabin air with lubricants. Furthermore, there is a need for an apparatus and method for cooling an air-cooled motor that functions efficiently during flight.

SUMMARY OF THE INVENTION

In one aspect of the present invention, an apparatus for cooling a motor comprises a closed-loop fan for supplying forced air to the motor; and a motor cooler, wherein a recycle air exits the motor and enters the motor cooler; and wherein the motor cooler provides cooled air to the closed-loop fan.

In a further aspect of the present invention, a compressor cooling system for a vehicle comprises a motor including a motor housing; a compressor driven by the motor such that the compressor compresses a ram air; a closed-loop fan for supplying forced air into the motor housing; and a motor cooler for receiving a recycle air from the motor housing, wherein the motor cooler cools the recycle air to provide cooled air to the closed-loop fan.

In still a further aspect of the present invention, a compressor cooling system for a vehicle comprises a motor including a motor housing; a compressor driven by the motor such that the compressor compresses a ram air; a closed-loop fan for withdrawing forced air from the motor housing; and a motor cooler for receiving a recycle air from the motor housing, wherein the motor cooler cools the recycle air to provide cooled air to the closed-loop fan.

In another aspect of the present invention, a cabin air compressor cooling system for an aircraft comprises a motor; a fan for supplying forced air into the motor; a motor cooler such that a recycle air exits the motor and enters the motor cooler; and a compressor driven by the motor and disposed between the motor and the motor cooler such that the compressor compresses a ram air after the ram air flows across the motor cooler; wherein the motor cooler provides cooled air to the fan.

In yet another aspect of the present invention, a compressor cooling system for an aircraft comprises a motor; a compressor driven by the motor, wherein the compressor compresses a ram air; a backface cavity situated between the motor and the compressor; a closed-loop fan for supplying forced air into the motor; a motor cooler such that a recycle air exits the motor and enters the motor cooler; wherein the motor cooler provides cooled air to the closed-loop fan; and an air conditioning pack for receiving a compressed air from the compressor.

In still a further aspect of the present invention, a method for cooling a motor comprises forcing air into the motor; drawing recycle air from the motor into a motor cooler; cooling the recycle air within the motor cooler to produce a cooled air; and feeding the cooled air into the motor.

In yet a further aspect of the present invention, a method for cooling a motor comprises forcing air into an electric motor by using a closed-loop fan; flowing air across a stator and rotor of the electric motor for cooling; drawing recycle air from the electric motor into an air-to-air heat exchanger; driving a compressor with the electric motor, wherein the compressor compresses a ram air; cooling the recycle air within the air-to-air heat exchanger to produce a cooled air; cooling the air-to-air heat exchanger with another ram air; and feeding the cooled air into the electric motor; wherein the electric motor comprises an oil-free electric motor and includes an air bearing. The cooled air into the electric motor also may provide cooling air for the air bearing.

These and other aspects, objects, features and advantages of the present invention, are specifically set forth in, or will become apparent from, the following detailed description of a preferred embodiment of the invention when read in conjunction with the accompanying drawings.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a closed-loop, oil-free cooling system, such as for an air-cooled, cabin air compressor of a more electric aircraft (MEA). This system can include a motor cooler that uses ram air to cool a stream of air that removes heat from an electric motor that is used to drive the compressor for, example, an environmental control system of an aircraft. Although the following description will describe the present invention as being used in aircraft, the following description should be understood to be applicable to other suitable uses, such as ground vehicles and stationary installations to provide cooling air. The present invention may be used in systems that drive electric generators, hydraulic pumps, or other equipment requiring constant speed operation.

Because the present invention recycles cooling air in a closed-loop and does not rely on oil-lubricated bearings, it has several advantages over prior art motor cooling systems. For example, the cooling system of the present invention features: decreased motor size, because continuous compression of low-density fresh air at high altitudes is not required; operation without the risk of contaminating cabin air with traces of lubricant oil; the ability to sustain extreme temperatures; and either no scheduled maintenance, or a reduced maintenance schedule because lubricant levels do not have to be checked. Thus, the present invention differs from the prior art in that a motor cooler uses a closed-loop air system to remove heat from an oil-free electric motor having air bearings.

Figure 1:
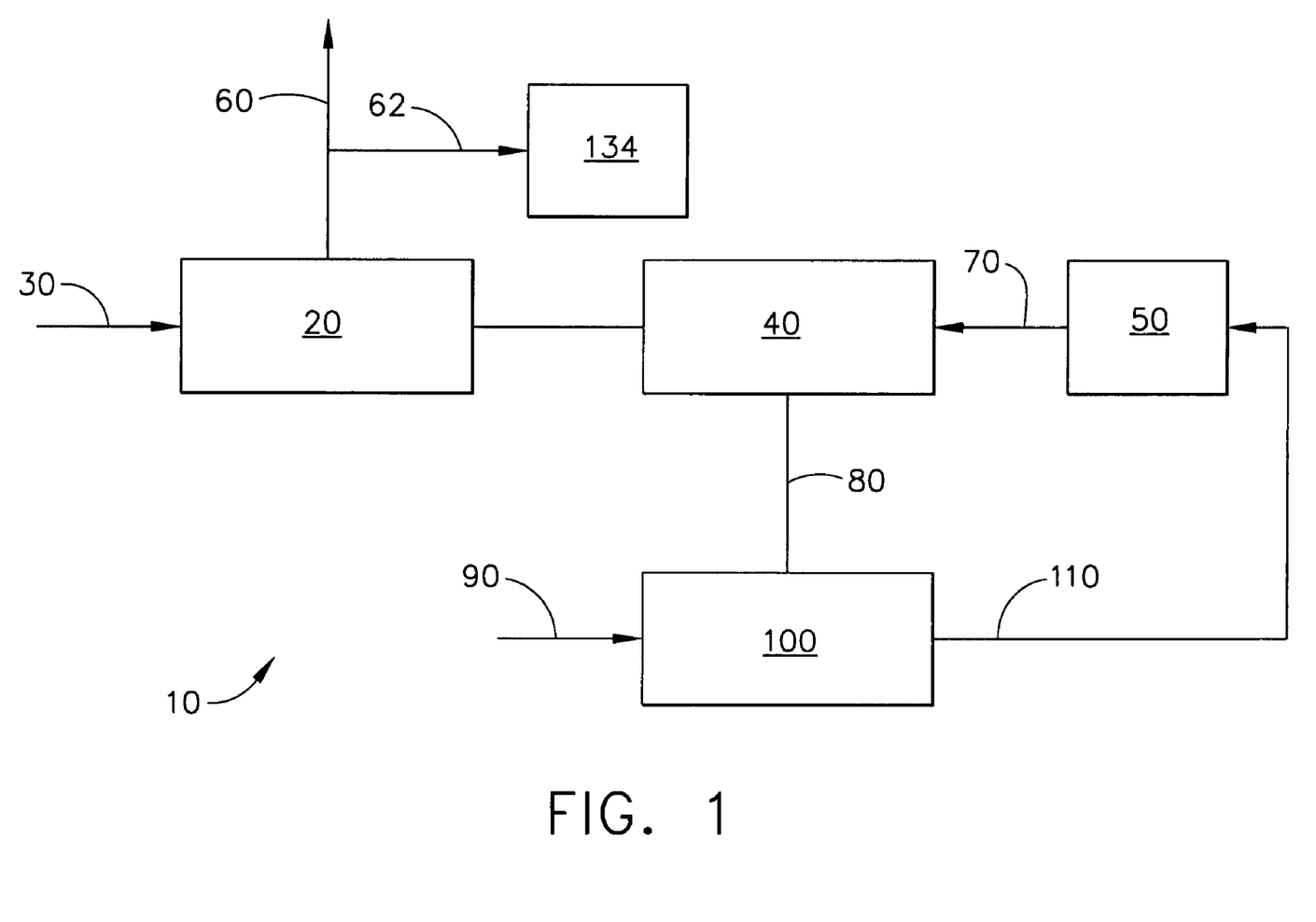
FIG. 1 is a block diagram schematically representing a cooling system for an air-cooled motor, according to the present invention.

In more specifically describing the present invention, and as can be appreciated from FIG. 1, the present invention provides a compressor cooling system 10 which may be located aboard an aircraft. Ram air 30 may enter a compressor 20 which may compress the ram air 30 to provide compressed air 60. A first portion 62 of compressed air 60 may be ducted to an air conditioning pack 134. The compressor 20 may be coupled to a motor 40. In some cases, an electric motor may be used to drive the compressor 20. As an example, motor 40 may comprise a variable speed permanent magnet motor. As heat is produced by the motor 40, a cooling air 70 may be provided to the motor 40 by a closed-loop fan 50. As the cooling air 70 removes heat from the motor 40, the hotter recycle air 80 may leave the motor 40 and enter a motor cooler 100. A ram air 90 (not necessarily the same as ram air 30) may flow across the motor cooler 100 to remove heat from the recycle air 80 to produce a cooled air 110. The cooled air 110 may leave the motor cooler 100 and may be supplied to the closed-loop fan 50 for repeated cooling of the motor 40. The closed-loop fan 50 may be driven by the motor 40 or by a dedicated motor (not shown).

Figure 2:
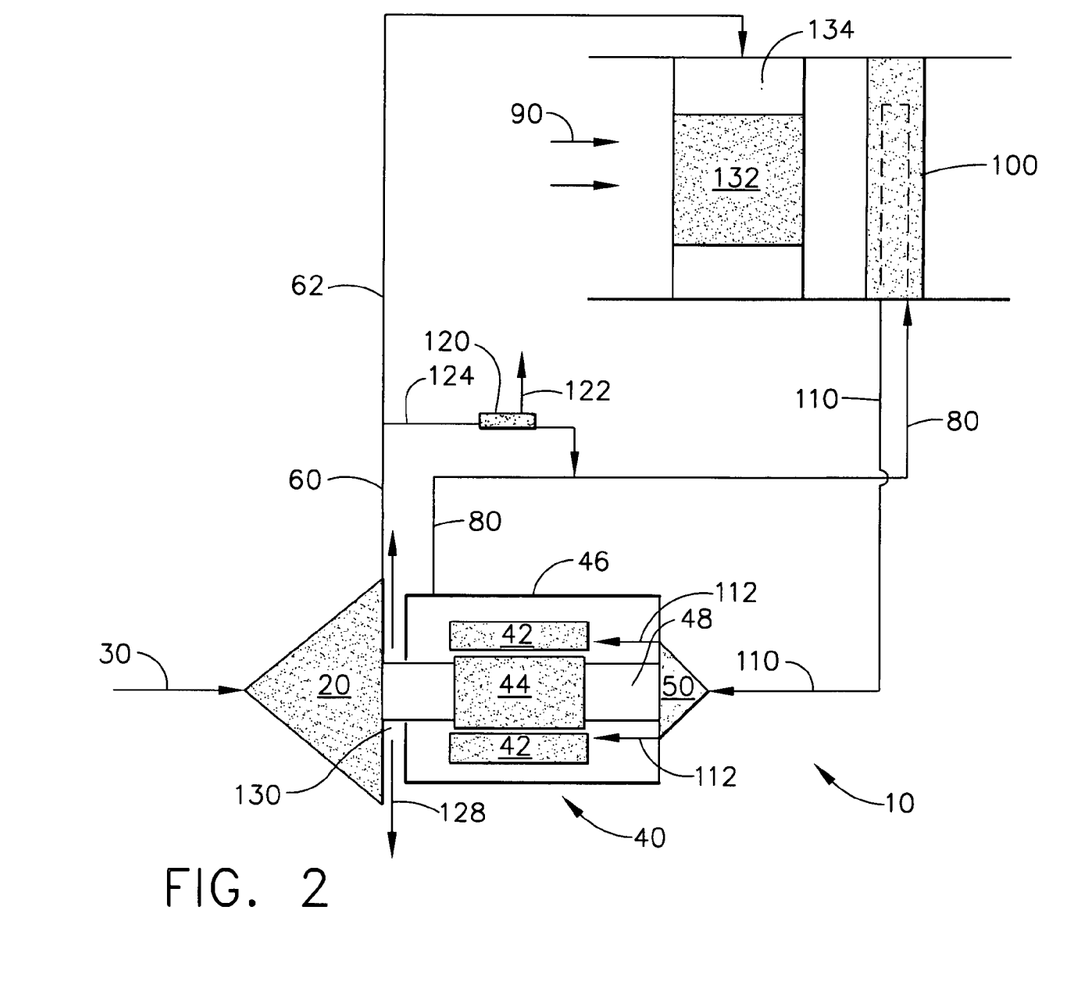
FIG. 2 is a schematic of a cooling system, according to an embodiment of the present invention.

Another embodiment of a cooling system of the present invention is shown schematically in FIG. 2. A portion of the compressed air 60 may be fed to an air conditioning pack 134 for cooling cabin air. Compressor cooling system 10 may comprise motor 40 that includes a motor housing 46. Inside the motor housing 46, a shaft 48 may rotate to drive a rotor 44 adjacent to a stator 42. A closed-loop fan 50 may move a forced air 112, which may flow within the motor housing 46 and across the shaft 48, the stator 42, and the rotor 44 The closed-loop fan 50 may be driven by the shaft 48. The closed-loop fan 50 may be affixed to the motor housing 46 or to another part of the motor 40. However, the closed-loop fan 50 may also adequately move the forced air 112 without being affixed or attached to the motor housing 46 or any other part of the motor 40. For example, in an alternative embodiment (not shown), closed-loop fan 50 may be a stand-alone unit disposed at a location remote from motor 40.

While the elements in the compressor cooling system 10 may be shown in FIG. 2 in axial alignment (for example, compressor 20 and motor 40), it should be understood that the present invention may or may not have the elements in axial alignment.

A backface cavity 130 may be disposed between the motor 40 and the compressor 20. The backface cavity 130 may be open to the external environment. As the forced air 112 travels the length of the motor 40, a portion of forced air 112 may exit, or leak, through the backface cavity 130 as seal leakage air 128. To replace any seal leakage air 128, a make-up air 124 may be added, for example, to the recycle air 80. As an example, make-up air 124 may be obtained by ducting a portion of the compressed air 60 for combination with recycle air 80. Optionally, the make-up air 124 may be filtered with a scavenge flow filter 120, which may remove waste 122 from the make-up air 124. The make-up air 124 may be added, optionally controlled by a valve (not shown), to the recycle air 80 as needed.

The motor cooler 100 may comprise an air-to-air heat exchanger. A heat exchanger 132, which may be incorporated into the air conditioning pack 134, may be placed adjacent to the motor cooler 100. The motor cooler 110 may be cooled by a ram air 90.

Figure 3:
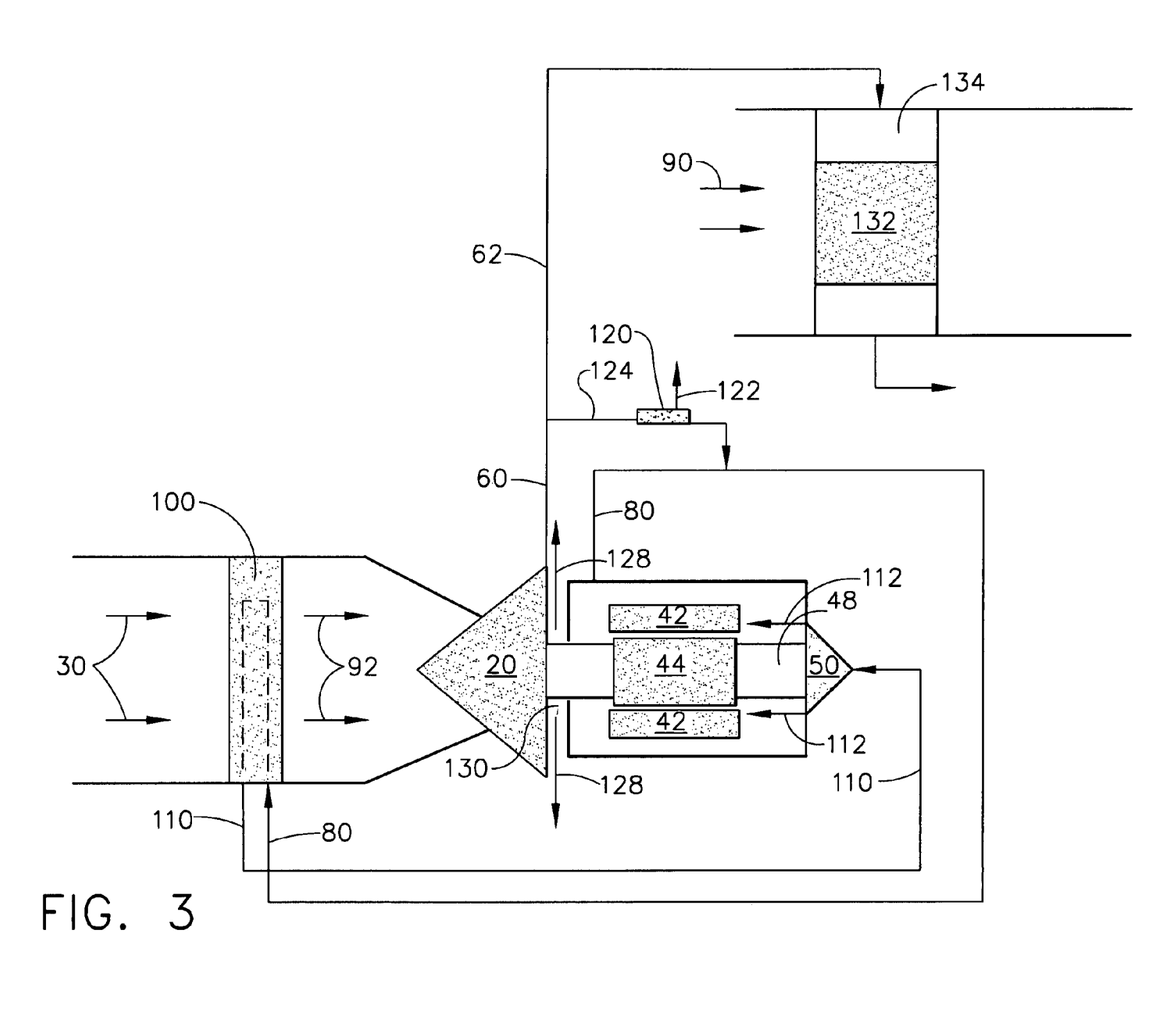
FIG. 3 is a schematic of a cooling system, according to another embodiment of the present invention.

A schematic representation of a further embodiment of a compressor cooling system 10 is shown in FIG. 3. The embodiment of compressor cooling system 10 shown in FIG. 3 may have the same or similar elements, features, and characteristics as described above with reference to FIG. 2. However, in the embodiment shown in FIG. 3, the compressor cooling system 10 may be configured such that the ram air 90 compressed by the compressor 20 is the same ram air 90 that flows across the motor cooler 100. A first portion of a single source of ram air 30 may be compressed by the compressor 20, and a second portion 92 of the single source of ram air 30 may flow through the motor cooler 100.

As shown in FIG. 3, the compressor 20 also may be located between the motor 40 and the motor cooler 100. While the elements in the compressor cooling system 10 may be shown in FIG. 3 in axial alignment (for example, motor cooler 100, compressor 20, and motor 40), it should be understood that the present invention may or may not have the elements in axial alignment. While placing the compressor 20 between the motor 40 and the motor cooler 100 is one way to configure the compressor cooling system 10 such that the compressor 20 compresses a ram air 90 after the ram air 90 flows across the motor cooler 100, it should be understood that the present invention may be configured in other ways such that the same ram air 90 that is compressed by the compressor 20 is also the same ram air 90 that flows across and cools the motor cooler 100.

Figure 4:
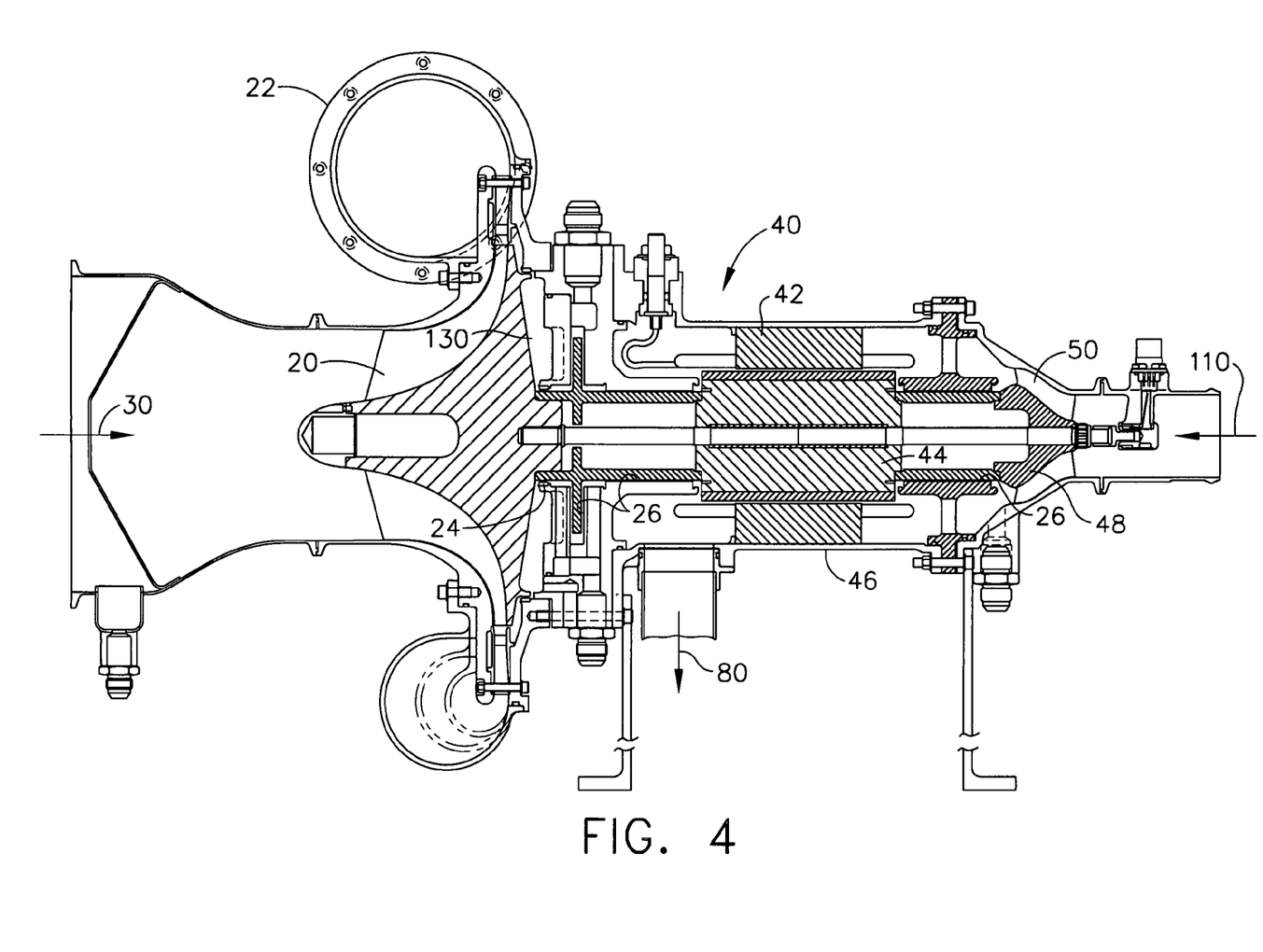
FIG. 4 is a cross-sectional view of a motor and compressor, according to an embodiment of the present invention.

In FIG. 4, a cross-sectional view of a motor 40 and a compressor 20, according to a further embodiment of the present invention is shown. The embodiment of motor 40 shown in FIG. 4 may have the same or similar elements, features, and characteristics as described above with reference to FIGS. 2 and 3. However, differences from FIGS. 2 and 3, or more details, may be shown in FIG. 4. For example, the compressor 20 may be attached to a compressor discharge 22, as compared with the motor 40 in FIGS. 2 and 3, which do not show a compressor discharge 22. Shaft seal 24 may be the site where seal leakage air 128 (shown in FIGS. 2 and 3) may exit, or leak, through the backface cavity 130. The motor 40 may comprise at least one air bearing 26, typically a plurality of air bearings 26, and more typically exclusively air bearings 26 (i.e., motor 40 may typically lack oil-lubricated bearings), as compared to the prior art oil-lubricated systems.

Figure 5:
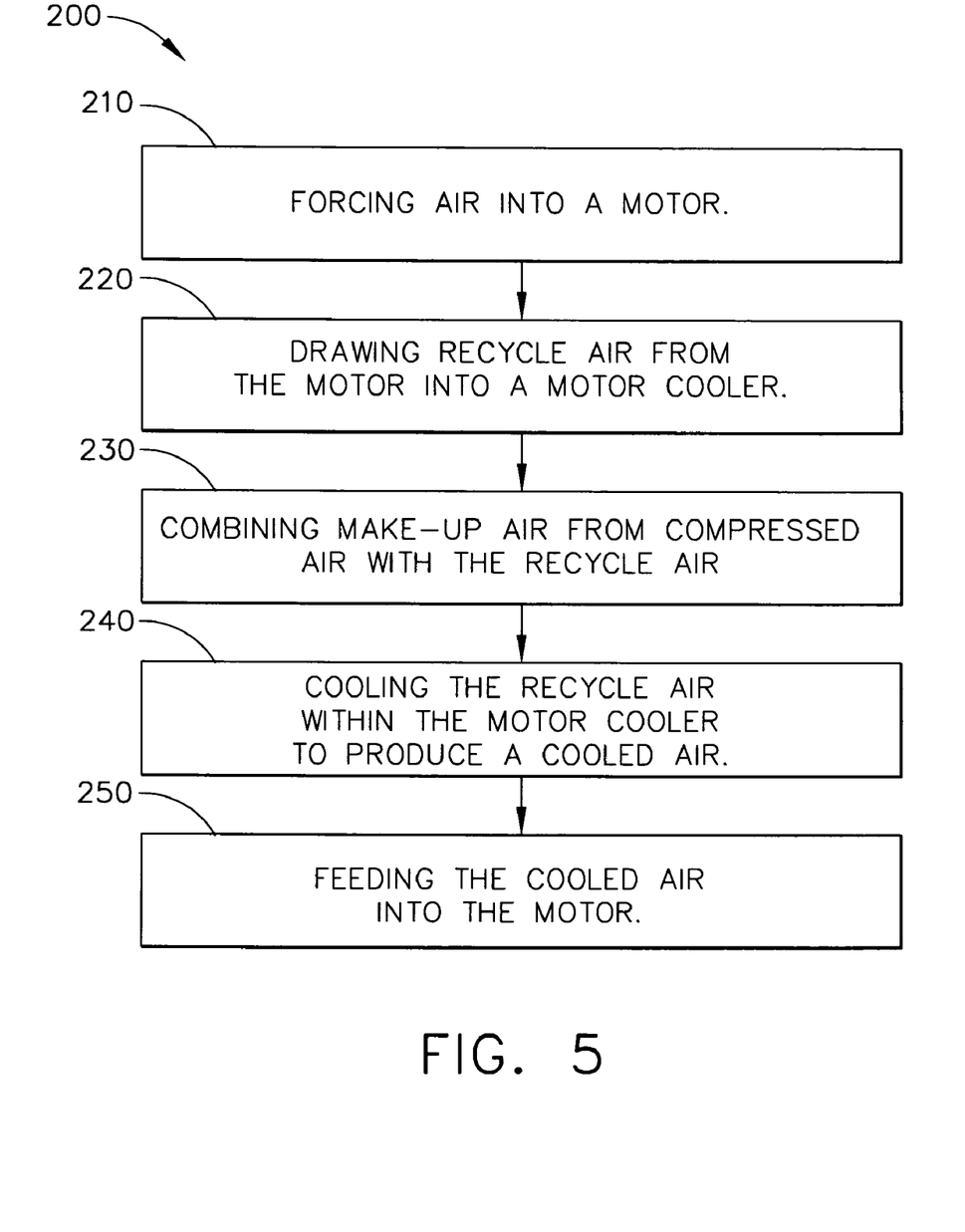
FIG. 5 is a flow chart of a method for cooling a motor, according to an embodiment of the present invention.

With reference to FIG. 5, a method 200 for cooling a motor 40, according to yet another embodiment of the present invention, is described. Method 200 may comprise a step 210 of forcing forced air 112 into a motor 40. Thereafter, step 220 may involve drawing recycle air 80 from the motor 40 into a motor cooler 100. Thereafter, step 230 may comprise combining make-up air 124 from the compressed air 60 with the recycle air 80. Thereafter, step 240 may comprise cooling the recycle air 80 within the motor cooler 100 to produce a cooled air 110; and step 250 may comprise feeding the cooled air 110 into the motor 40. Optionally, the forcing step 210 may include using a closed-loop fan 50 for forcing the air 112 into the motor 40. The motor 40 may be an oil-free motor, such as an electric motor having air bearings. The feeding step 250 may include using a closed-loop fan 50 for feeding the cooled air 110 into the motor 40.

Figure 6:
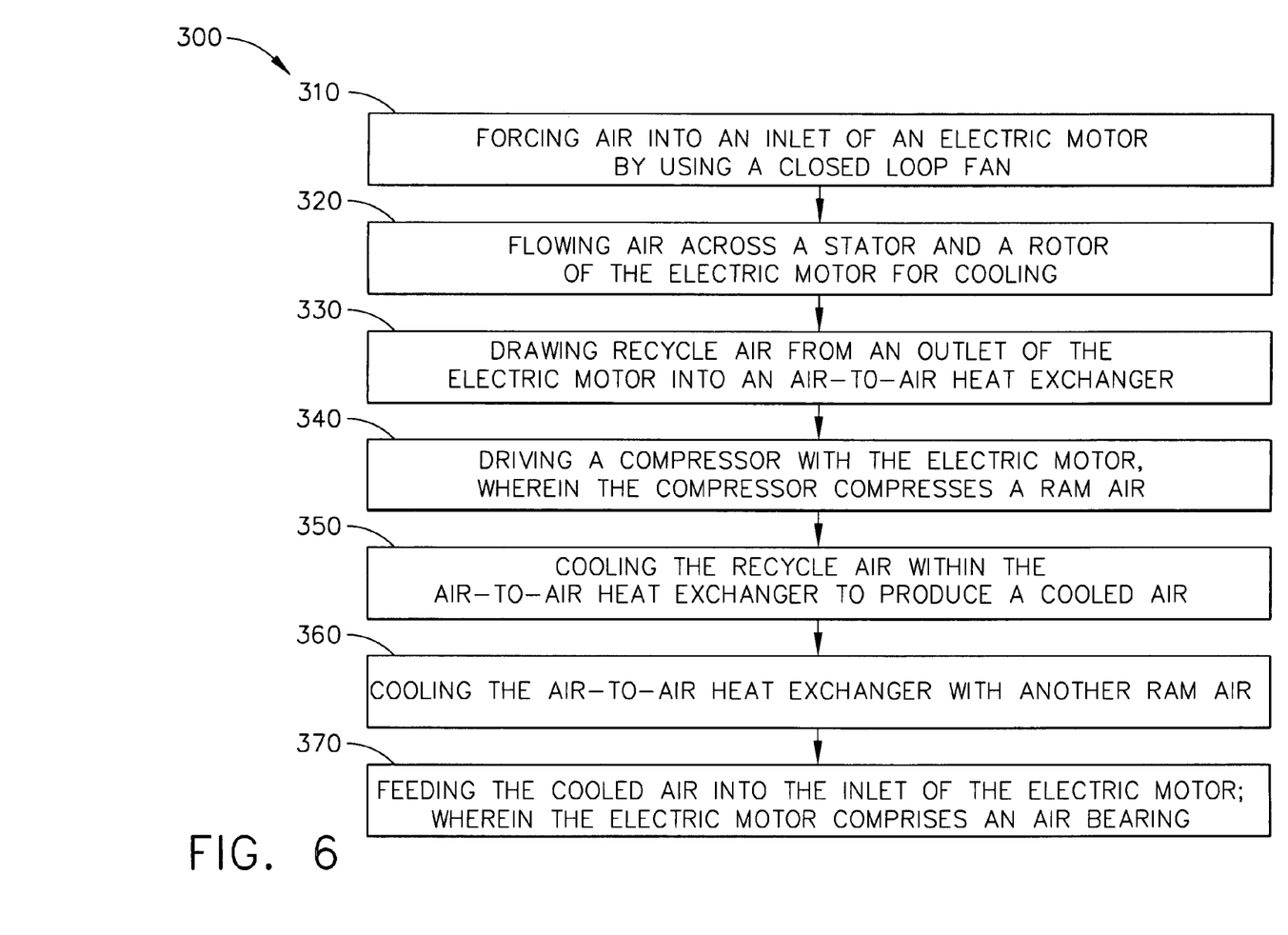
FIG. 6 is a flow chart of a method for cooling a motor, according to another embodiment of the present invention.

With reference to FIG. 6, a method 300 for cooling a motor 40, according to still another embodiment of the present invention, is described. Method 300 may comprise a step 310 of forcing air 112 into an electric motor 40 by using a closed-loop fan 50. Thereafter, a step 320 may comprise flowing air 112 across a stator 42 and a rotor 44 of the electric motor 40 for cooling. Thereafter, a step 330 may involve drawing recycle air 80 from the electric motor 40 into an air-to-air heat exchanger. Thereafter, a step 340 may comprise driving a compressor 20 with the electric motor 40, wherein the compressor 20 compresses a ram air 30. Thereafter, a step 350 may involve cooling the recycle air 80 within the air-to-air heat exchanger to produce a cooled air 110. Thereafter, a step 360 may comprise cooling the air-to-air heat exchanger with another ram air 90, and a step 370 may involve feeding the cooled air 110 into the electric motor 40, wherein the electric motor 40 comprises at least one air bearing 26. Optionally, a step 380 may comprise combining make-up air 124 from the compressed air 60 with the recycle air 80.

It should be understood, of course, that the foregoing relates to exemplary embodiments of the invention and that modifications may be made without departing from the spirit and scope of the invention as set forth in the following claims.

We claim:

1. An apparatus for cooling a motor, comprising:
   a closed-loop fan for supplying forced air to a motor, wherein the motor comprises an air bearing; and
   a motor cooler;
   wherein a recycle air exits the motor and enters the motor cooler;
   wherein the motor cooler provides cooled air to the closed-loop fan; and
   a motor housing, wherein the closed-loop fan is driven by a dedicated motor.

2. The apparatus of claim 1, wherein the motor cooler comprises an air-to-air heat exchanger.

3. The apparatus of claim 1, wherein the motor cooler is cooled by a ram air.

4. A compressor cooling system for a vehicle, comprising:
   a motor including a motor housing;
   a compressor driven by the motor such that the compressor compresses a ram air;
   a closed-loop fan for supplying forced air into the motor housing; and
   a motor cooler for receiving a recycle air from the motor housing,
   wherein the motor cooler cools the recycle air to provide cooled air to the closed-loop fan.

5. The compressor cooling system of claim 4, wherein the motor cooler is cooled by a ram air.

6. The compressor cooling system of claim 4, wherein a first portion of a single source of ram air is compressed by the compressor, and a second portion of the single source of ram air flows through the motor cooler.

7. The compressor cooling system of claim 4, wherein the compressor is disposed between the motor and the motor cooler.

8. The compressor cooling system of claim 6, wherein the compressor is in axial alignment with the motor and the motor cooler.

9. The compressor cooling system of claim 4, wherein the closed-loop fan is affixed to the motor housing.

10. The compressor cooling system of claim 4, wherein the motor comprises an air bearing and wherein the motor is oil-free.

11. A compressor cooling system for a vehicle, comprising:
    a motor including a motor housing;
    a compressor driven by the motor such that the compressor compresses a ram air;
    a closed-loop fan for withdrawing forced air from the motor housing; and
    a motor cooler for receiving a recycle air from the motor housing,
    wherein the motor cooler cools the recycle air to provide cooled air to the closed-loop fan.

12. The compressor cooling system of claim 11, wherein the motor cooler comprises an air-to-air heat exchanger.

13. The compressor cooling system of claim 11, wherein the closed-loop fan is affixed to the motor housing.

14. The compressor cooling system of claim 11, wherein the closed-loop fan is driven by a dedicated motor.

15. A cabin air compressor cooling system for an aircraft, comprising:
    a motor;
    a fan for supplying forced air into the motor;

a motor cooler such that a recycle air exits the motor and enters the motor cooler; and a compressor driven by the motor and disposed between the motor and the motor cooler such that the compressor compresses a ram air after the ram air flows across the motor cooler;

wherein the motor cooler provides cooled air to the fan.

16. The compressor cooling system of claim 15, wherein the motor is an electric motor.

17. The compressor cooling system of claim 15, wherein the motor cooler comprises an air-to-air heat exchanger.

18. A compressor cooling system for an aircraft, comprising:

a motor;

a compressor driven by the motor, wherein the compressor compresses a ram air;

a backface cavity situated between the motor and the compressor;

a closed-loop fan for supplying forced air into the motor;

a motor cooler such that a recycle air exits the motor and enters the motor cooler;

wherein the motor cooler provides cooled air to the closed-loop fan; and an air conditioning pack for receiving a compressed air from the compressor.

19. The compressor cooling system of claim 18, wherein the motor is an electric motor.

20. The compressor cooling system of claim 18, wherein the motor cooler comprises an air-to-air heat exchanger.

21. The compressor cooling system of claim 18, wherein the backface cavity is open to the external environment.

22. The compressor cooling system of claim 21, wherein a seal leakage air exits through the backface cavity.

23. The compressor cooling system of claim 22, wherein make-up air is diverted from a portion of the compressed air and fed to the recycle air.

24. The compressor cooling system of claim 23, wherein a scavenge flow filter removes waste from the portion of the compressed air to provide clean make-up air.

25. The compressor cooling system of claim 18, wherein the motor cooler is cooled by a ram air.

26. The compressor cooling system of claim 25, wherein a first portion of a single source of ram air is compressed by the compressor, and a second portion of the single source of ram air flows through the motor cooler.

27. A method for cooling a motor, comprising:

forcing air into the motor;

drawing recycle air from the motor into a motor cooler;

cooling the recycle air within the motor cooler to produce a cooled air;

feeding the cooled air into the motor; and combining make-up air from a compressed air with the recycle air.

28. The method of claim 27 wherein the forcing step includes using a closed-loop fan for forcing the air into the motor.

29. The method of claim 27 wherein the motor cooler comprises an air-to-air heat exchanger.

30. The method of claim 27, wherein the feeding step includes using a closed-loop fan for feeding the cooled air into the motor.

31. The method of claim 27, further comprising cooling the motor cooler with a ram air.

32. The method of claim 27, wherein the motor comprises an air bearing and wherein the motor is oil-free.

33. A method for cooling a motor, comprising:

forcing air into an electric motor by using a closed-loop fan;

flowing air across a stator and a rotor of the electric motor for cooling;

drawing recycle air from the electric motor into an air-to-air heat exchanger;

driving a compressor with the electric motor, wherein the compressor compresses a ram air;

cooling the recycle air within the air-to-air heat exchanger to produce a cooled air;

cooling the air-to-air heat exchanger with another ram air; and feeding the cooled air into the electric motor;

wherein the electric motor comprises an oil-free electric motor and includes an air bearing.

* * * * *